(12) United States Patent
Arikado et al.

(10) Patent No.: US 7,042,790 B2
(45) Date of Patent: May 9, 2006

(54) SEMICONDUCTOR DEVICE, SALES METHOD FOR SEMICONDUCTOR DEVICE, SALES SYSTEM FOR SEMICONDUCTOR DEVICE AND PROGRAM PRODUCT STORING SALES PROGRAM FOR SEMICONDUCTOR DEVICE

(75) Inventors: Tsunetoshi Arikado, Tokyo (JP); Katsuya Okumura, Tokyo (JP); Kazuhide Yoneya, Sagamihara (JP); Masaru Koyanagi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 500 days.

(21) Appl. No.: 09/964,759

(22) Filed: Sep. 28, 2001

(65) Prior Publication Data

US 2002/0038260 A1 Mar. 28, 2002

(30) Foreign Application Priority Data

Sep. 28, 2000 (JP) .............................. 2000-297447

(51) Int. Cl.
*G11C 8/00* (2006.01)
(52) U.S. Cl. .............................. 365/230.01; 365/225.7
(58) Field of Classification Search ........... 365/189.01, 365/189.02, 189.05, 200, 230.01, 225.7
See application file for complete search history.

(56) References Cited

U.S. PATENT DOCUMENTS

| 5,305,265 | A  | * | 4/1994  | Sugibayashi ................. 365/194 |
| 5,579,256 | A  | * | 11/1996 | Kajigaya et al. ............... 365/51 |
| 6,278,336 | B1 | * | 8/2001  | Tinsley et al. ................. 331/74 |
| 6,337,843 | B1 | * | 1/2002  | Yoshida et al. ........ 369/178.01 |
| 6,351,425 | B1 | * | 2/2002  | Porter ..................... 365/225.7 |
| 6,449,198 | B1 | * | 9/2002  | Hamade et al. ............. 365/198 |
| 6,535,427 | B1 | * | 3/2003  | Takano et al. ......... 365/185.21 |

FOREIGN PATENT DOCUMENTS

| JP | 2000-040181 | 2/2000 |
| JP | 2000-113047 | 4/2000 |
| JP | 2000-305989 | 11/2000 |

\* cited by examiner

*Primary Examiner*—Andrew Joseph Rudy
(74) *Attorney, Agent, or Firm*—Finnegan, Henderson, Farabow, Garrett & Dunner, L.L.P.

(57) ABSTRACT

A semiconductor device includes a plurality of cell arrays, a selection control circuit to generate and to output a selection control signal. An array selection circuit generates internal address signals on the basis of an external address signal and the selection control signal. The array selection circuit outputs the internal address signals to the plurality of cell arrays to select ones of the cell arrays. A sales method for selling semiconductor devices includes presenting function-related information and price-related information on partially good semiconductor devices to client terminals and prompting the client terminals to provide purchase/non-purchase information and determining the possibility of successful transactions on the basis of the purchase/non-purchase information. A sales system for selling semiconductor devices uses the sales method and a sales program product for causing a computer system to sell semiconductor devices using the sales method.

7 Claims, 10 Drawing Sheets

| | Selected array | φ1 | φ2 | φ3 | φ4 | ρ1 | ρ2 | ρ3 | A0 | M1 | M2 |
|---|---|---|---|---|---|---|---|---|---|---|---|
| 1 | MA1 & MA2 | 1 | 1 | 0 | 0 | 1 | 0 | 0 | – | 0 | 1 |
| 2 | MA1 & MA3 | 1 | 0 | 1 | 0 | 0 | 1 | 0 | – | 0 | 1 |
| 3 | MA1 & MA4 | 1 | 0 | 0 | 1 | 1 | 1 | 0 | – | 0 | 1 |
| 4 | MA2 & MA3 | 0 | 1 | 1 | 0 | 0 | 0 | 1 | – | 0 | 1 |
| 5 | MA2 & MA4 | 0 | 1 | 0 | 1 | 1 | 0 | 1 | – | 0 | 1 |
| 6 | MA3 & MA4 | 0 | 0 | 1 | 1 | 0 | 1 | 1 | – | 0 | 1 |
| 7 | MA1 & MA4 | 1 | 0 | 0 | 1 | 1 | 1 | 0 | 1 | 0 | 0 |
| 8 | MA1 & MA2 | 1 | 0 | 0 | 1 | 1 | 0 | 1 | 1 | 1 | 1 |
| 9 | MA2 & MA3 | 0 | 1 | 1 | 0 | 0 | 0 | 0 | 0 | 0 | 0 |
| 10 | MA2 & MA3 | 0 | 1 | 1 | 0 | 1 | 1 | 1 | 0 | 1 | 1 |

Default:
A0 = "1" Array MA1 & MA4 are selected
A0 = "0" Array MA2 & MA3 are selected

FIG. 6

SEMICONDUCTOR DEVICE, SALES METHOD FOR SEMICONDUCTOR DEVICE, SALES SYSTEM FOR SEMICONDUCTOR DEVICE AND PROGRAM PRODUCT STORING SALES PROGRAM FOR SEMICONDUCTOR DEVICE

CROSS-REFERENCE TO RELATED APPLICATIONS

This application is based upon and claims the benefit of priority from the prior Japanese Patent Application No. 2000-297447, filed Sep. 28, 2000, the entire contents of which are incorporated herein by reference.

BACKGROUND OF THE INVENTION

1. Field of the Invention

This invention relates to a sales method for selling partially good semiconductor products by way of a communication network, a sales system for semiconductor devices, a recording medium storing a sales program for semiconductor devices and a rejected semiconductor device adapted to operates as partially good device.

2. Description of the Related Art

General purpose memories are normally designed to comprise a plurality of memory cell arrays in order to reduce the length and hence the capacity of each bit line and/or lower the power consumption rate of the memory. A memory comprising a plurality of memory cell arrays is produced by way of a memory cell array dividing operation. Such an operation is necessary mainly because of restrictions imposed on it such as standard specifications for refreshing and/or the configuration of output bits. Then, the cell arrays are selectively activated according to the externally input addresses.

It is a normal practice for most memory producers to concurrently develop memory products with different memory sizes (e. g., 576M, 512M, 288M, 256M, 144M and 128M). Then, the memory products of different memory sizes are developed by minimally modifying the positions of the address pads for externally input addresses and the control pads for the purpose of raising the efficiency of development. In the course of development, however, some of the memory cells of a memory product can become defective due to one or more than one problems in the manufacturing process. Then, the memory chip cannot be produced with the designed memory size. If the chip meets the two requirements of (1) having parity cells for the ECC (error checking and correcting) feature and (2) some of the defective memory cells of the cell arrays can be replaced by the parity cells, the chip is produced as a product without the ECC function. If the cell arrays of chips are free from problems and the demand for products without the ECC function (e. g., 576M is replaced by 512M, 288M is replaced by 256M and 144M is replaced by 128M), the chips may also be produced as products without the ECC function.

FIG. 1 of the accompanying drawing schematically illustrates the configuration of a known general purpose memory. Referring to FIG. 1, it comprises a plurality of cell arrays that are adapted to be selectively activated according to the externally input addresses. More specifically, the illustrated known memory comprises four cell arrays provided with respective parity cell regions for the ECC function. Of the four cell arrays, two are driven to operate separately by an internal address signal. In other words, they are activated selectively. In FIG. 1, reference symbols MA1 through MA4 denotes first through fourth cell arrays respectively. The cell arrays MA1 through MA4 are driven to operate separately, or selectively activated, by cell array selection signals $\phi 1$, $\phi 2$. Reference symbols PA1 through PA4 in MA1 through MA4 denote parity cell regions for parity bits. Reference symbol AS denotes an array selection circuit 91, which is adapted to receive external address (A0) and generate cell array selection signals $\phi 1$, $\phi 2$.

Now, the operation of the general purpose memory will be described below.

As the chip is activated and external address (A0) is input to the array selection circuit 91, the latter generates cell array selection signals $\phi 1$, $\phi 2$, which are then used to select cell arrays. In the instance of FIG. 1, the circuit is so configured that $\phi 1$ comes to level "H" when A0 is at "H" whereas $\phi 2$ comes to level "H" when A0 is at "L". Thus, when A0 is at "H", $\phi 1$ comes to level "H" to selectively activate the cell arrays A1 and A4.

Now, assume that the parity cell region PA4 contains a defective area (Err_PA4) that cannot be relieved by the redundancy feature of the chip. Then, it is no longer possible to develop and market the chip as semiconductor memory device having an ECC function. However, since the defect is found only in the parity cell region, the chip can be developed and marketed as product having no ECC function. More specifically, for instance, a product designed as 288M product may be developed and marketed as 256M product. In other words, the product operates as product having no ECC function without any problem and it is nominally referred to as a product having no ECC function. Therefore, the circuit system is not designed for a total shutdown of the parity bit circuit and a chip information rewriting operation (e.g., information on the presence or absence of an ECC function). Thus, the chip cannot be classified as perfectly good product having no ECC function. A similar discussion may be made when a product having an ECC function is developed marketed as a product having no ECC function because of the demand for products.

In the above discussion, it is assumed that a parity cell region contains a defective area. However, there may be cases where a defect is found outside the parity cell regions or the chip cannot find any particular application. Then, a chip having an ECC function will be developed and marketed as an ECC having no ECC function regardless if its memory cell arrays contain an defect or not in order to improve the yield of manufacturing products having no ECC function and also the efficiency of product development. However, such a technique of excluding the ECC function and reducing the memory size will not remarkably improve the manufacturing yield.

Assume, for example, that a product contains a defective area (Err_MA1) outside the parity cell regions and the cell array (MA1) is completely out of order due to the defect. Then, under the current circumstances, the chip will completely lose its market value although three out of the four cell arrays operate without any problem. Of course, like the earlier discussion, it may not become a perfectly good product if it is made to apparently have no ECC function because the circuit system is not modified.

As discussed above, the integrated circuits comprising a large number of elements and coming out from a manufacturing line may include partially good ones that are not perfectly good but will operate satisfactorily depending on the application regardless if the ICs are memories or logic devices.

For example, a partially good product may be a 256 mega-bit DRAM that has lost the memory capacity of 6 mega-bits but operates well as 250 mega-bits memory. As pointed out above, a partially good product may be not a memory but a logic device that was designed to have a number of functions but has lost some of them, although the remaining features are quite good.

To date, such partially good products are rejected as no good products and disposed as waste. Attempts have been made to sell them as partially good products. However, because of the market practice of selling and buying semiconductor products on a lot basis, there is no knowing who want to buy such imperfect products and all such attempts have failed so far.

As pointed out above, chips containing one or more than one defects can be turned to partially good products by appropriately processing them. However, partially good products are not perfectly good products and, under the current circumstances, there is no knowing who want to buy partially good products. Therefore, to date, such partially good products are simply wasted to make the semiconductor manufacturer partly miss the expected profit.

On the other hand, from the viewpoint of buyers of semiconductor devices, who may be computer manufacturers, memory devices having an unnecessarily large memory capacity simply push up the prices of their products. For instance, assume that a computer system needs to be provided with a memory having a memory capacity of 160 mega bits. Then, a 128 mega-bit memory will not do but the memory capacity of a 256 mega-bit memory is too much. However, no memories with a memory capacity between 128 mega bits and 256 mega bits are commercially available. Thus, the computer manufacturer is formed to mount a 256 mega-bit memory on the computer system, although the memory capacity is too much. Of course, the computer manufacturer may buy a partially good memory product having a memory capacity of 170 or 180 mega bits if such a product is commercially available. However, there is no knowing which semiconductor manufacturer is selling such an imperfect product.

BRIEF SUMMARY OF THE INVENTION

In an aspect of the present invention, there is provided a sales method for selling semiconductor devices by way of a communication network, the method comprising: presenting function-related information and price-related information on partially good semiconductor devices having one or more than one unusable functions to the client terminals by way of the communication network and prompting the client terminals to provide purchase/non-purchase information; and determining the possibility of successful transactions on the basis of the purchase/non-purchase information provided from client terminals.

In another aspect of the invention, there is provided a sales method for selling semiconductor devices by way of a communication network, the method comprising: presenting function-related information on a semiconductor device to be possibly purchased by way of the communication network; and providing purchase/non-purchase information on the basis of the function-related information and the price-related information on partially good semiconductor devices having one or more than one unusable functions and the function specified in the function-related information provided by way of the communication network.

In still another aspect of the invention, there is provided a sales system for selling semiconductor devices by way of a communication network, the system comprising: a products to be possibly purchased registering means for obtaining function-related information on semiconductor devices to be possibly purchased from the client terminals by way of the communication network; a partially good products presenting means for presenting function-related information and price-related information on partially good semiconductor devices having one or more than one unusable functions and the functions specified in the function-related information obtained by the products to be possibly purchased registering means and prompting the client terminals to provide purchase/non-purchase information; and a possibility of successful transaction determining means for obtaining purchase/non-purchase information on the partially good products from the client terminals and determining the possibility of successful transactions on the basis of the purchase/non-purchase information provided from client terminals.

In still another aspect of the invention, there is provided a semiconductor device comprising: a plurality of cell arrays; a selection control circuit for generating and outputting a selection control signal to be used for generating an internal address signal for selecting at least one of the plurality of cell arrays; an array selection circuit for generating the internal address signal on the basis of an external address signal and the selection control signal and outputting it to the plurality of cell arrays; the array selection circuit being adapted to define the correspondence of each piece of information contained in the selection control signal and a selectable combination of any of the plurality of cell arrays and output an internal address signal for selecting any of the combinations of the plurality of cell arrays.

The present invention is applicable to a computer-readable recording medium storing a program for causing a computer to execute a procedure corresponding to the present invention (to operate as means corresponding to the present invention or to realize a function corresponding to the present invention). Furthermore, the present invention is also applicable to such a program stored in a computer-readable recording medium.

BRIEF DESCRIPTION OF THE SEVERAL VIEWS OF THE DRAWING

FIG. 6 is a chart illustrating the correspondence of the status of selection control signals and an external address signal to the status of array selection signals and mode selection signals that can be used for the purpose of the invention;

DETAILED DESCRIPTION OF THE INVENTION

Now, the present invention will be described by referring to the accompanying drawings that illustrate embodiments of the invention.

FIRST EMBODIMENT

Figure 2:
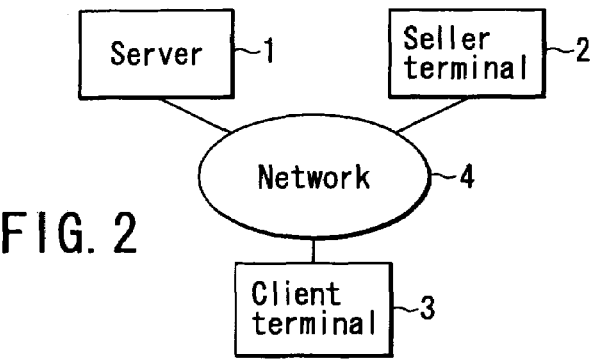
FIG. 2 is a schematic illustration of the configuration of a communication network to be used for the first embodiment of system for selling semiconductor devices according to the invention.

FIG. 2 is a schematic illustration of the configuration of a communication network to be used for the first embodiment of a system for selling semiconductor devices according to the invention. In FIG. 2, a server 1, a seller terminal 2 and a client terminal 3 are connected to the network 4. The server 1 executes a computer program for successfully concluding transactions of selling and buying semiconductor devices. The seller terminal 2 is dedicated to the seller who manufactures and wants to sell partially good semiconductor devices. The client terminal 3 is dedicated to a client who wants to buy one or more than one partially good semiconductor devices from the semiconductor device seller. While only a single seller terminal 2 and a single client terminal 3 are shown in FIG. 2, normally a plurality of sellers and a plurality of clients are connected to the network 4.

Figure 3:
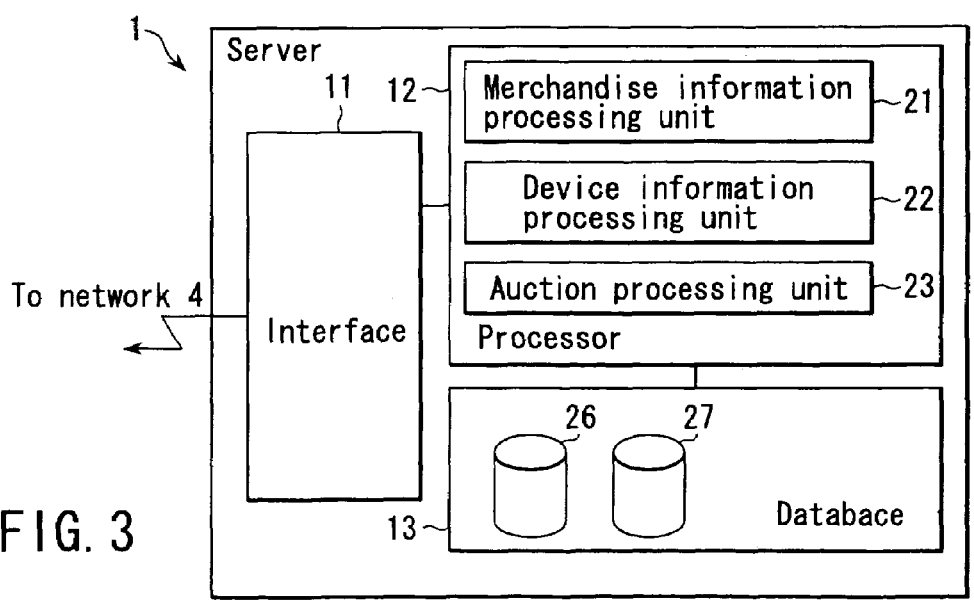
FIG. 3 is a schematic block diagram of the server of the first embodiment, illustrating its configuration.

FIG. 3 is a schematic block diagram of a possible configuration of the server of the first embodiment. As shown in FIG. 3, the server 1 comprises an interface 11, a processor 12 connected to the interface 11 and a data base 13 connected to the processor 12.

The processor 12 functions as a merchandise information processing unit 21, an information on devices to be possibly purchased processing unit 22 (device information processing unit 22), an auction processing unit 23 and so on.

The merchandise information processing unit 21 has functions of requesting the seller terminal 2 to provide function-related information and price-related information on partially good semiconductor devices, obtaining function-related information and price-related information on partially good semiconductor devices from the seller terminal 2, storing the obtained information in the merchandise data base 26 in the data base 13 and so on.

The device information processing unit 22 has functions of prompting the client terminal 3 to provide function-related information and price-related information on the one or more than one devices that the client wants to buy, storing the function-related information and the price-related information obtained on the one or more than one devices that the client wants to buy in a information on devices to be possibly purchased storing unit 27 (device information storing unit 27) in the data base 13 and so on.

The auction processing unit 23 has functions of showing the function-related information and the price-related information on the devices to be possibly purchased on a web page of the network, prompting the seller terminal 2 to provide a request for selling the devices and so on.

As the processor 12 reads out a predetermined program from a storage device (not shown), the processor 12 functions as the merchandise information processing unit 21, the device information processing unit 22, the auction processing unit 23 and so on.

Figure 4:
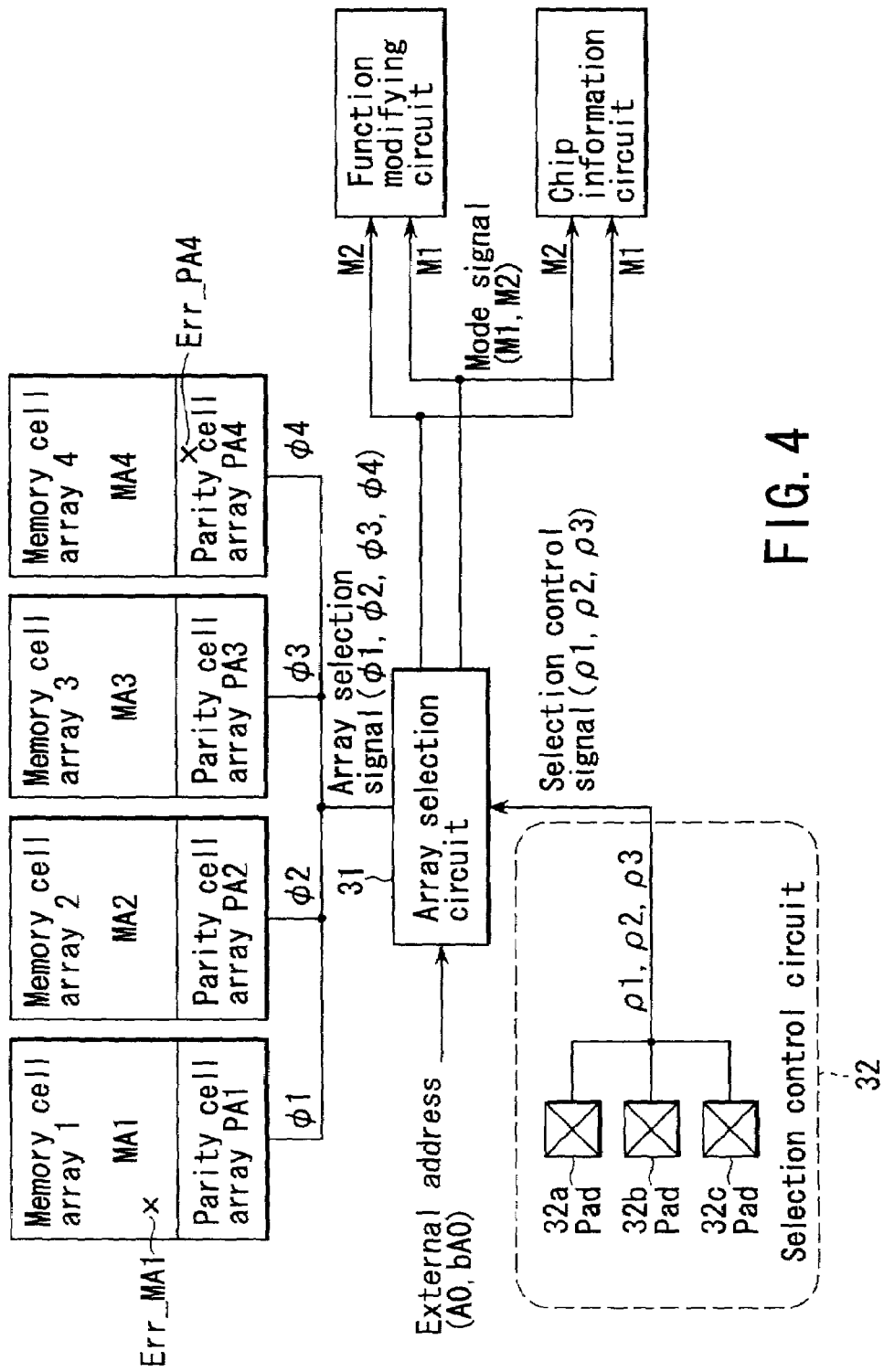
FIG. 4 is a schematic block diagram of a semiconductor memory device that can be put to sale by means of the first embodiment of system for selling semiconductor devices, illustrating its entire configuration.

FIG. 4 is a schematic circuit diagram of a semiconductor memory device that may be sold and bought by means of the embodiment of semiconductor device sales system, illustrating its entire configuration.

Figure 1:
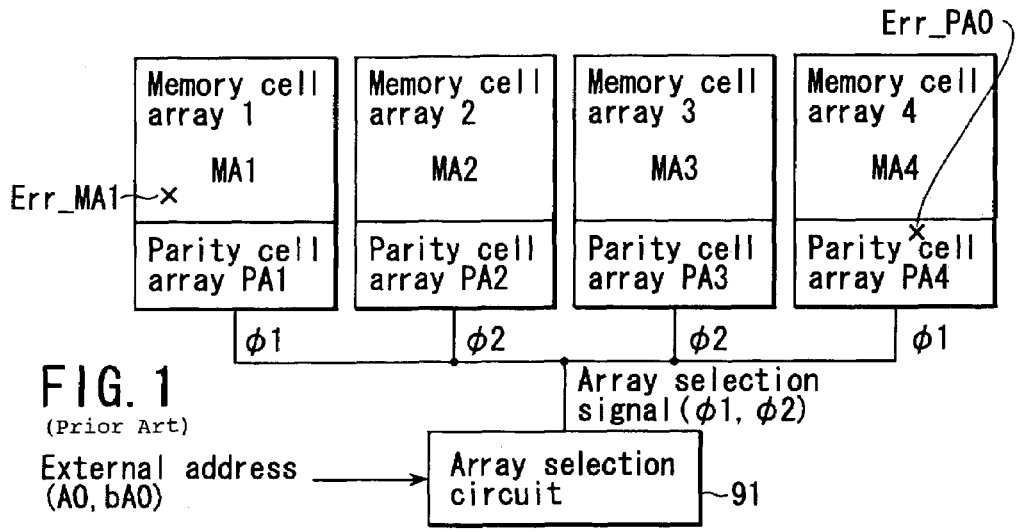
FIG. 1 is a schematic block diagram of a known semiconductor memory device.

FIG. 4 shows four memory cell arrays MA1 through MA4. The memory cell arrays MA1 through MA4 includes respective parity cell arrays PA1 through PA4 for performing the ECC (error checking and correcting) function. Two of the memory cell arrays MA1 through MA4 operate separately by an internal address signal generated according to an external address signal A0. In other words, the circuit is so configured that a part of the cell arrays is selectively activated. This semiconductor device differs from the one shown in FIG. 1 in that it is provided with a selection control circuit for generating selection control signals for controlling the array selection circuit, which will be described hereinafter.

More specifically, the memory cell arrays MA1 through MA4 are made to operate separately by cell array selection signals $\phi1$ through $\phi4$. In other words, they are selectively activated. To be more accurate, the MA1 is activated by $\phi1$, the MA2 is activated by $\phi2$, the MA3 are activated by $\phi3$ and MA4 are activated by and $\phi4$. The array selection circuit 31 receives external address signal A0 and selection control signals $\rho1$ through $\rho3$ as inputs. Then, the array selection circuit 31 generates cell array selection signals $\phi1$ through $\phi4$ and mode selection signals M1 and M2 on the basis of the inputs and outputs them. The selection control circuit 32 generates selection control signals $\rho1$ through $\rho3$ for selecting any of the memory cell arrays MA1 through MA4 to be activated by means other than an external address and outputs them to the array selection circuit 31.

Mode selection signals are supplied to circuits whose functions are to be modified by the mode selection signals (function modifiable circuits) and peripheral circuits including a chip information circuit designed to store various pieces of chip related information. An example of function modifiable circuit is an input/output circuit dedicated to parity bits. A chip information circuit may typically be realized by means of a register. As a mode selection signal is output to such a function modifiable circuit, the function of the function modifiable circuit is modified. The information stored in the chip information circuit is rewritten as a mode selection signal is output to the chip information circuit. Modification of the function may be suspension of the function. In the instance of FIG. 4, mode selection signals M1 and M2 are both supplied to function modifiable circuit 101 and chip information circuit 102.

Mode selection signal M1 is used to identify the status of the circuit system in terms of having or not having the parity function. If the product has no defect, the mode selection signal M1 is normally held to level "L". At level "L", the input/output circuit dedicated to parity bits is active and the chip information circuit holds the information that "the ECC function is there". As the mode selection signal M1 is turned from level "L" to level "H", the function modifiable circuit 101 is notified of the level shift and the input/output circuit dedicated to parity bits of the function modifiable circuit 101 is completely shut down. Additionally, as the mode selection signal M1 is turned to level "H", the chip information circuit 102 is notified of the level shift and the information indicating the presence or absence of the ECC function is changed from "the ECC function is there" to "the ECC function is not there".

Mode selection signal M2 is used to identify the status of the circuit system in terms of having or not having the function of memory cell array. If the product has no defect, the mode selection signal M2 is normally held to level "L". At level "L", the signal indicates that "the address space is normal" and "the memory size is regular". As the mode selection signal M2 is turned from level "L" to level "H", the chip information circuit 102 is notified of the level shift and, as a result, the address space information in the chip information circuit 102 is rewritten. Additionally, as the mode selection signal M2 is turned to level "H", the function modifiable circuit 101 is notified of the level shift and the circuit system is modified for the one or more than one circuits that will be affected by the fact that the memory size is halved.

It should be noted that the above functions of mode selection signals M1 and M2 are described only as examples. In other words, they may be defined to modify the system in various different ways. For instance, they may be used to rewrite not only the information on the presence or absence of the ECC function but also the address space information and the memory size when rewriting the chip information. Alternatively, independent signals may be used for rewriting the chip information and for modifying the function of a function modifiable circuit (e. g., M1 may be used for rewriting the chip information and M2 may be used for modifying the function of a function modifiable circuit or vice versa). Still alternatively, more mode selection signals may be introduced to make them take smaller parts so that, for example, M1 may be used to rewrite the chip information when modifying the function of the parity array and M2 may be used to stop the function of the parity output circuit while M3 may be used to rewrite the chip information when modifying the function of the memory cell array and M4 may be used to modify the function of a function modifiable circuit. The address space information may be rewritten in different way when the function of the parity cell array is suspended and when the function of the memory cell array.

The selection control circuit 32 comprises three pads 32a through 32c. The pads 32a through 32c may or may not be bonded to the Vcc terminal (not shown) for use. Binary selection control signals ρ1 through ρ3 and binary phase-inverted logic signals bρ1 through bρ3 can be generated differently depending on if the pads 32a through 32c are bonded or not. Phase-inverted logic signals bρ1 through bρ3 are obtained by inverting the phases of selection control signals ρ1 through ρ3. More specifically, selection control signals ρ1 through ρ3 are at level "H" and phase-inverted logic signals bρ1 through bρ3 are at level "L" if the pads 32a through 32c are bonded to the Vcc terminal, whereas selection control signals ρ1 through ρ3 are at level "L" and phase-inverted logic signals bρ1 through bρ3 are at level "H" if the pads 32a through 32c are not bonded to the Vcc terminal.

Figure 5:
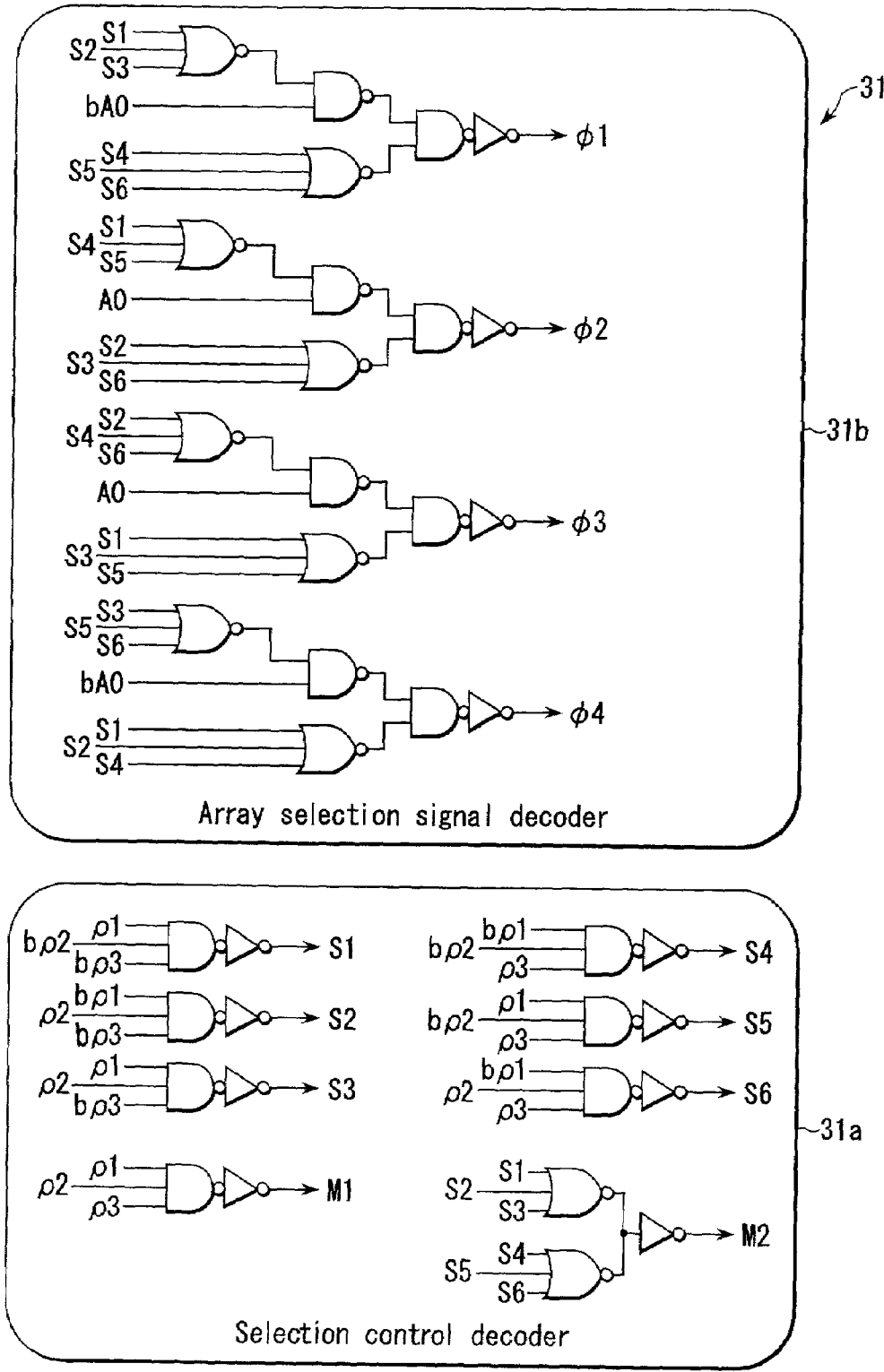
FIG. 5 is a schematic circuit diagram of an array selection circuit that can be used for the purpose of the invention, illustrating its configuration.

FIG. 5 is a schematic circuit diagram of the array selection circuit 31, illustrating its circuit configuration. As shown in FIG. 5, the array selection circuit 31 comprises two circuits including a selection control decoder 31a and an array selection signal decoder 31b.

The selection control decoder 31a comprises a plurality of logic elements for performing NAND operations, NOR operations and inverting operations for selection control signals ρ1 through ρ3 and phase-inverted logic signals bρ1 through bρ3. The logic elements perform decoding operations in six different ways depending on the status of selection control signals ρ1 through ρ3 in six different ways and generate auxiliary selection signals S1 through S6. Additionally, the logic elements perform decoding operations in two different ways of M1 and M2 and generate mode selection signals.

The array selection decoder 31b comprises a plurality of logic elements for performing NAND operations, NOR operations and inverting operations for auxiliary selection signals S1 through S6 obtained from the selection control decoder 31a, external address signal A0 and phase-inverted signal bA0 of external address signal. The logic elements decodes array selection signals φ1 through φ4 depending on the status of auxiliary selection signals S1 through S6 and external address signal A0.

FIG. 6 is a chart illustrating the correspondence of the status of selection control signals ρ1 through ρ3 and external address signal A0 to that of array selection signals φ1 through φ4 and mode selection signals M1, M2.

As described above, signals ρ1 through ρ3 are at level "L" if none of the pads 32a through 32c are bonded to the Vcc terminal. Under this condition, mode selection signals M1 and M2 are both at level "L". Each of the memory cell arrays MA1 through MA4 is activated depending on the status of address signal A0. More specifically, signals φ2 and φ3 are brought to level "H" if address signal A0 is at level "L". As a result, the memory cell arrays M2 and M3 are selectively activated. On the other hand, signals φ1 and φ4 are brought to level "H" if address signal A0 is at level "H". As a result, the memory cell arrays M1 and M4 are selectively activated.

Now, the overall operation of the semiconductor memory device will be discussed below.

When the semiconductor memory device is activated and external address signal A0 is input to the array selection circuit 31, array selection signals φ1 through φ4 are generated in the array selection circuit 31.

As the first example, assume that a defect (Err_PA4) that cannot be relieved by the redundancy circuit occurred in the parity cell array PA4. Then, the semiconductor memory device needs to be developed and marketed as a product having no ECC function.

Then, all the pads 32a through 32c are bonded to the Vcc terminal. As a result of the bonding operation alone, mode selection signal M1 is brought from level "L" to level "H" (see lines 8 through 10 of FIG. 6). Thus, the circuit is modified as a result of rewriting mode selection signal M1 so as to bring it from level "L" to level "H". More specifically, the input/output circuit dedicated to parity bits to which the mode selection signal M1 is applied is completely shut down and the information "having the ECC function" is rewritten to "having no ECC function" in the chip information circuit.

The status of array selection signals φ1 through φ4 is as described below when all the pads 32a through 32c are bonded to the Vcc terminal. It is clear by referring to lines 8 through 10 of FIG. 6, the status of each of array selection signals φ1 through φ4 changes depending on the status of address signal A0. As shown on line 8 in FIG. 6, signals φ1 and φ4 are brought to level "H" if address signal A0 is at level "H". As a result, the memory cell arrays MA1 and MA4 are selectively activated. On the other hand, as shown on line 10 in FIG. 6, signals φ2 and φ3 are brought to level "H" if address signal A0 is at level "L". As a result, the memory cell arrays M2 and M3 are selectively activated.

In this way, a product having no ECC function can be developed from a product having the ECC function simply by bonding the pads 32a through 32c to the Vcc terminal regardless if the memory cell arrays MA1 through MA4 contains any defective area or not. Since the input/output circuit dedicated to parity bits is shut down and the circuit system is modified by rewriting the information held in the chip information circuit while the product operates perfectly as a product having no ECC function, the product can be shipped as a perfect product having no ECC function.

As the second example, assume that a defect (Err_MA1) occurred in the memory cell array MA1 outside the parity cell region. When such a defect occurred, the memory cell array MA1 may become totally inoperative. Then, if it is possible to select and activate two of the memory cell arrays MA2 through MA4 that are functionally sound, the device can be developed and marketed as a product with a memory capacity of 144M that is a half of the designed memory capacity of 288M.

Thus, the memory cell arrays MA2 and MA3 are selected by fixing the status of address signal A0. A semiconductor memory device having a memory capacity equal to a half of the designed memory capacity can be realized simply by fixing the status of address signal A0 because of the following reason.

Generally, a memory device having a memory capacity having a half of the designed memory capacity can be realized by omitting an address space. Since two memory cell arrays are selectively activated depending on the status of address signal A0 in this embodiment, the memory cell capacity can be halved by fixing the status of address signal A0 either to level "H" or to level "L". The memory cell array MA1 is not selected nor activated when the status of address signal A0 is fixed to level "L". Therefore, only the memory cell arrays MA2 and MA3 are activated if the status of address signal A0 is fixed to level "L" by some means. Then, a memory device having a memory capacity having a half of the designed memory capacity can be realized.

Thus, even the semiconductor memory device contains a defective area in one of the memory cell arrays, a memory device having a memory capacity having a half of the designed memory capacity can be produced by fixing the status of address signal A0.

As the third example, assume that a defect (Err_MA1) occurred in the memory cell array 1 outside the parity cell region as in the second example and a similar defect occurred also in the memory cell array MA3.

In this cased, the memory device does not operate when the status of address signal A0 is simply fixed as in the case of the second example. As pointed out above, either the memory cell arrays MA1 and MA4 or the memory cell arrays MA2 and MA3 can be activated depending on the status of address signal A0. Therefore, if both the memory cell array MA1 and the memory cell array MA3 become defective, a semiconductor memory device having a memory capacity as small as a half of the designed memory capacity cannot be realized by simply fixing the status of memory address A0, although the remaining memory cell array MA2 and MA4 are functionally sound.

Therefore, when such a problem occurred, all the status of the pads 32a through 32c are fixed. As a result, it is now possible to select any two of the four memory cell arrays MA1 through MA4. More specifically, the pads 32a through 32c are bonded to the Vcc terminal in such a way that the memory cell arrays MA2 and MA4 are selectively activated by the bonding.

As shown on lines 1 through 6 in FIG. 6, there are six combinations where two of the four array selection signals come to level "H", considering that the pads 32a through 32c may or may not be bonded to the Vcc terminal. As shown on line 5 in FIG. 6, the memory cell arrays MA2 and MA4 can be selectively activated by bonding the pads 32a and 32c to the Vcc terminal.

As shown on lines 1 through 6 in FIG. 6, when two memory cell arrays are selected, the mode selection signal M2 is brought to level "H". Therefore, the circuit system is modified by carrying out certain operations such as rewriting the address space information in the chip information circuit and/or processing the remaining circuits for halving the memory size. As a result, the semiconductor memory device can be developed as a perfectly good product if the memory size is halved by omitting an address space.

The degree of freedom of bonding the pad 32a through 32c is relatively high if a defective area is found only in one of the memory cell arrays (in MA1 in the second example) as in the case of the above described second example. When a defective area is found only in one of the memory cell arrays, any three of the remaining three arrays may be selected and activated. Then, there are three combinations where two of the three arrays are selected; MA2 and MA3, MA2 and MA4 and MA3 and MA4. The status of the pads 32a through 32c corresponding to these combination are shown on line 4 through 6 in FIG. 6.

Thus, memory cell arrays MA2 and MA3, MA2 and MA4 or MA3 and MA4 may be selected out of the four memory cell arrays MA1 through M4 depending on if each of the pads 32a through 32c is bonded or not if the memory cell array MA1 is out of order.

As described above, with the above described embodiment of semiconductor device, any of the memory cell arrays produced by dividing a single original memory cell array can be selected by means other than an external address and the circuit system can be modified at the same time. As a result, regardless if a defect is found in the proper cell arrays or not, a product having a reduced memory size can be realized in an easy way.

To be more accurate, any two of the four memory cell arrays MA1 through MA4 produced by dividing the single original memory cell array can be selectively activated. Therefore, a perfect product with a halved memory size can be realized if a defect is found in a combination of two memory cell arrays that cannot be accommodated by simply fixing the status of address signal A0.

If the memory cell arrays are free from any defect, products with a memory size that is a half of the originally designed memory size may have to be developed depending on the demand of the market. Then, such products can be produced with ease simply by bonding the pads 32a through 32c to the Vcc terminal. Thus, the efficiency of developing and marketing products meeting the demand of the market can be significantly improved.

Figure 7:
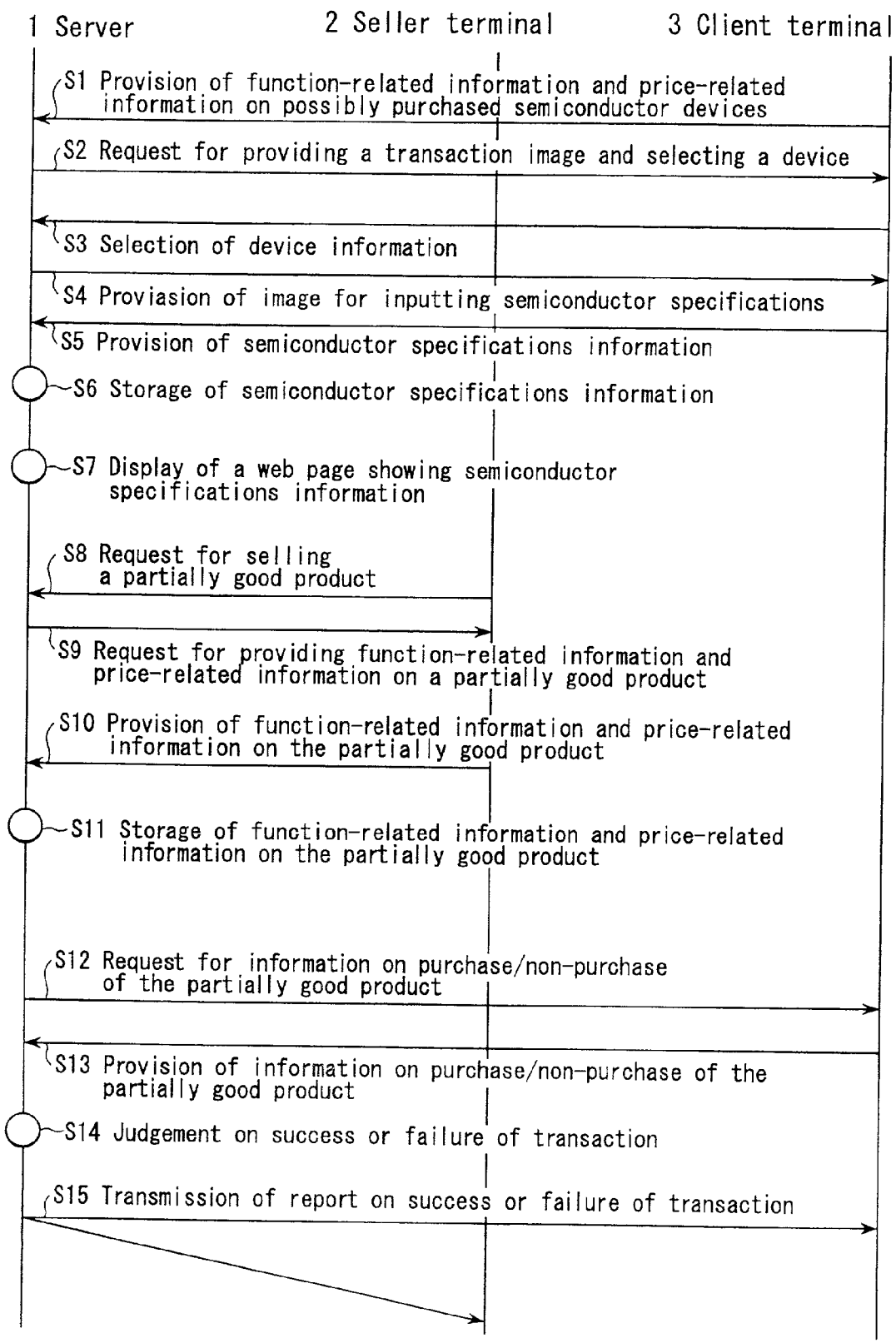
FIG. 7 is a flow chart of the operation of the first embodiment of system for selling semiconductor devices.

Now, the operation of selling a semiconductor device by means of a semiconductor device sales system as shown in FIG. 2 will be described by referring to the timing chart of FIG. 7.

Hereinafter, when describing the operation, the information exchange and request for the information processing between the server 1, the seller terminal 2 and the client terminal 3 carry out via the network 4.

Figure 8:
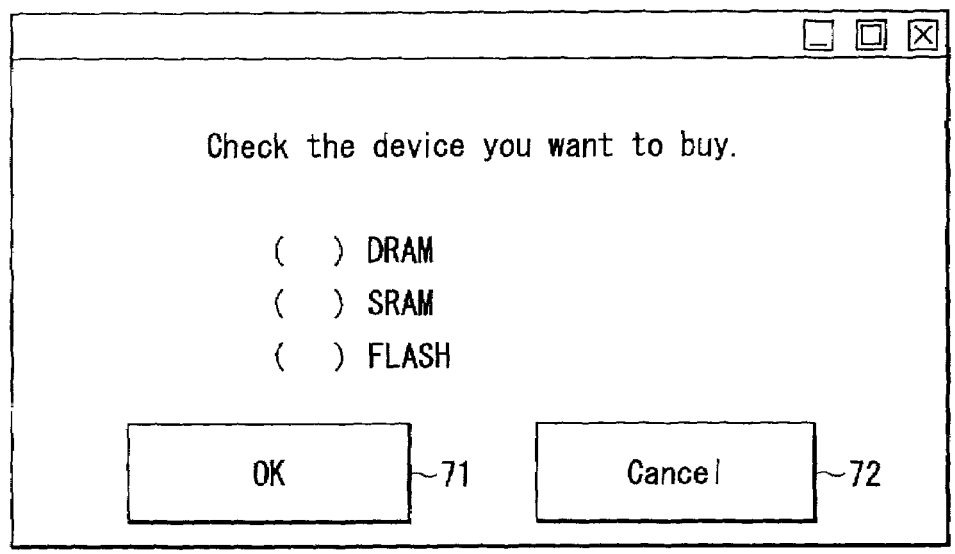
FIG. 8 is a schematic illustration of an image shown on the monitor screens of the client terminals of the first embodiment for the purpose of selection of devices.

A client who wants to by a semiconductor device accesses the server 1 by way of the client terminal 3 (S1). In response to the access by way of the client terminal 3, the device information processing unit 22 of the server 1 generates an image to be displayed for the client to select a device typically as shown in FIG. 8 and displays it at the client terminal 3 (S2). The client terminal 3 is prompted to select, for instance, one of DRAM, SRAM and FLASH as shown in FIG. 8. Then, the client may check the type of device he or she wants, seeing the image displayed on the display screen (not shown) of the client terminal 3. If the OK button 71 is clicked on the image, the information on the wanted device is transmitted to the server 1 (S3). If, on the other hand, the cancel button is clicked, the operation of registering the wanted device is terminated.

Figure 9:
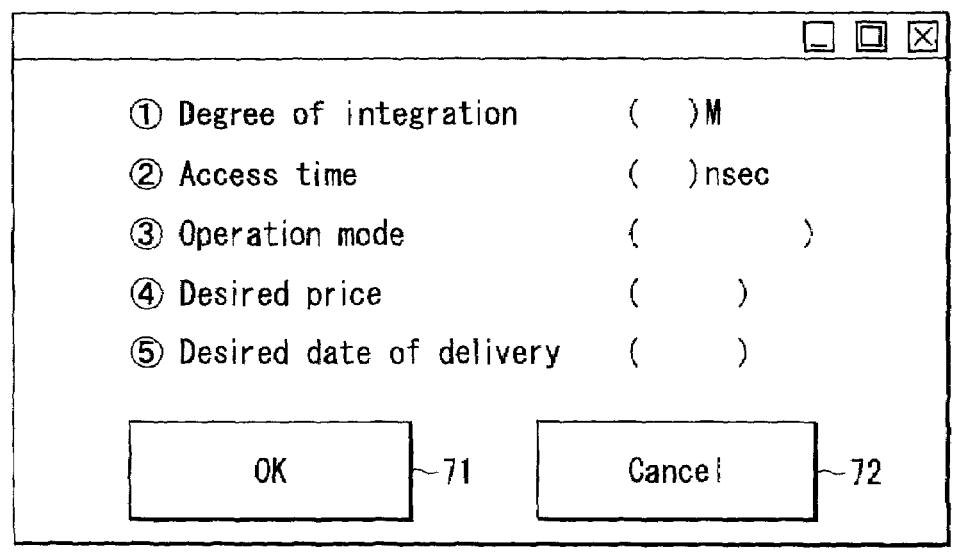
FIG. 9 is a schematic illustration of an image shown on the monitor screens of the client terminals of the first embodiment for the purpose of inputting specifications of a semiconductor device.

Upon receiving the information on the wanted device from the client terminal 3, the device information processing unit 22 of the server 1 generates an image for inputting the semiconductor specifications for specifying the functions of the wanted semiconductor device and provides the client terminal 3 with the image (S4). The image may be such as shown in FIG. 9. Then, the client terminal 3 is promoted to input the degree of integration, the access time, the operation mode, the desired price level and the desired delivery date for the semiconductor specifications. Then, the client inputs the semiconductor specifications of the wanted semiconductor device, seeing the image for inputting the semiconductor specifications displayed on the display screen (not shown) of the client terminal 3. As the OK button 71 is clicked on the image, the semiconductor specifications of the wanted semiconductor device are sent to the server 1 (S5). The device information processing unit 22 may be so adapted as to modify the parameters of the semiconductor specifications requested by the client terminal 3 depending on the type of device selected in the image shown in FIG. 8.

Upon receiving the semiconductor specifications from the client terminal 3, the device information processing unit 22 stores them in the information on devices to be possibly purchased storage 132 (S6) with information for identifying the client.

Then, the auction processing unit 23 of the server 1 holds an electric exhibition on a web page of the network 4, showing the semiconductor specifications and the related information stored in the information on devices to be possibly purchased storage 132 as part thereof (S7). The seller terminal 2 accesses this web page and, if it has a corresponding product and wants to it, referring to the semiconductor specifications and the related information shown on the web page, it presents a sales request to the server 1 (S8).

Upon receiving the sales request, the auction processing unit 23 of the server 1 prompts the seller terminal 2 to provide the function-related information (semiconductor specifications) and the price-related information on the partially good products the seller wants to sell (S9). More specifically, it is desirable that an image as shown in FIG. 9 is generated and a file of the image is transmitted to the seller terminal 2. Upon receiving the request for providing information on the partially good products the seller wants to sell, the seller terminal 2 transmits the function-related information and the price-related information on the partially good products that the seller wants to sell to the server 1 (S10). The function-related information and the price-related information on each of the partially good products that the seller wants to sell may include not only information on each of the semiconductor specifications as shown in FIG. 9 but also function-related information indicating if the circuit system has been modified or not and/or if the device is a perfectly good product having no ECC function or not.

The merchandise information processing unit 21 of the server 1 receives the function-related information and the price-related information on the partially good products from the seller terminal 2 and stores the received information in the merchandise data base 26 in the data base 13 (S11). Then, the auction information processing unit 123 of the server 1 transmits to the client terminal 3 an image requesting purchase/non-purchase information including the function-related information and the price-related information on one or more than one partially good products that the user wants to buy (S12). If information on partially good products is provided by more than one seller terminals 2 for a purchase request presented by the client terminal 3, a plurality of pieces of information on partially good products are provided to the client terminal 3. If the client wants to buy a plurality of partially good products, he or she can selects each of the partially good products he or she wants to buy on the image requesting purchase/non-purchase information for the product, referring to the function-related information and the price-related information of the product (S13). The selection information (purchase/non-purchase information) is then sent to the server 1, which then successfully concludes the transaction (Sl4). More specifically, the server 1 transmits information on the successfully concluded transaction to the client terminal 3 and the seller(s) 2 who wanted to sell the partially good product(s) (S15). If the client terminal 3 transmits information that the client does not want to buy any of the partially good products to the server in (S13), the server 1 determines that the transaction is unsuccessful (S14) and transmits information that the transaction is unsuccessful to all the sellers 2 and the client terminal 3 (S15).

As the above steps are followed, the transaction of selling and buy partially good products in the form of auction is completed.

Thus, with this embodiment of semiconductor device sales system, if a semiconductor device designed with a number of different functions becomes defective only in terms of one or more than one specific functions, it can be put to sale by way of a communication network in a simple way. Conversely, since the client can select a partially good product he or she wants to by from a plurality of partially good products put to sale, he or she can buy the lowest priced product in a so-called inverted auction. As pointed out earlier, partially good products are not designed to be manufactured as partially good products and hence it is very difficult to determine when they can be marketed successfully. However, according to the invention, such partially good products can be put to sale in a so-called inverted auction and quickly find buyers.

Additionally, a semiconductor device is a perfect product so long as it performs desired functions, if some of the large number of functions it has become inoperative. In other words, if the functions that the client wants are identified, such a partially good product can be purchased by the client regardless if the products has other functions or not. Particularly, considering that such partially good products are not identical in terms of functions, this advantage of being able to quickly finding a possible buyer is enormous. The probability of successful concluding a transaction for each of such partially good products is very high. Still additionally, partially good products under consideration are not semiconductor devices that are produced after orders specifying the functions thereof as in ordinary transactions of semiconductor devices but are those that are already on the shelf and hence available at any time. Therefore partially good products can be delivered very quickly unlike ordinary semiconductor devices. Furthermore, such partially good products have hitherto been discarded as no good products. Thus, the seller may be able to remarkably raise the sales and the profits by selling such partially good products.

SECOND EMBODIMENT

This embodiment is realized by modifying the first embodiment, which is a semiconductor memory device adapted to be sold by way of a communication network. This embodiment of semiconductor memory device is characterized in that the selection control circuit is realized by using laser fuses. The basic configuration of this embodiment is same as that of the first embodiment. Therefore, this embodiment will be described only in terms of the difference between this embodiment and the first embodiment. The components of this embodiment that are same as or similar to those of the first embodiment are denoted respectively by the same reference symbols.

Figure 10:
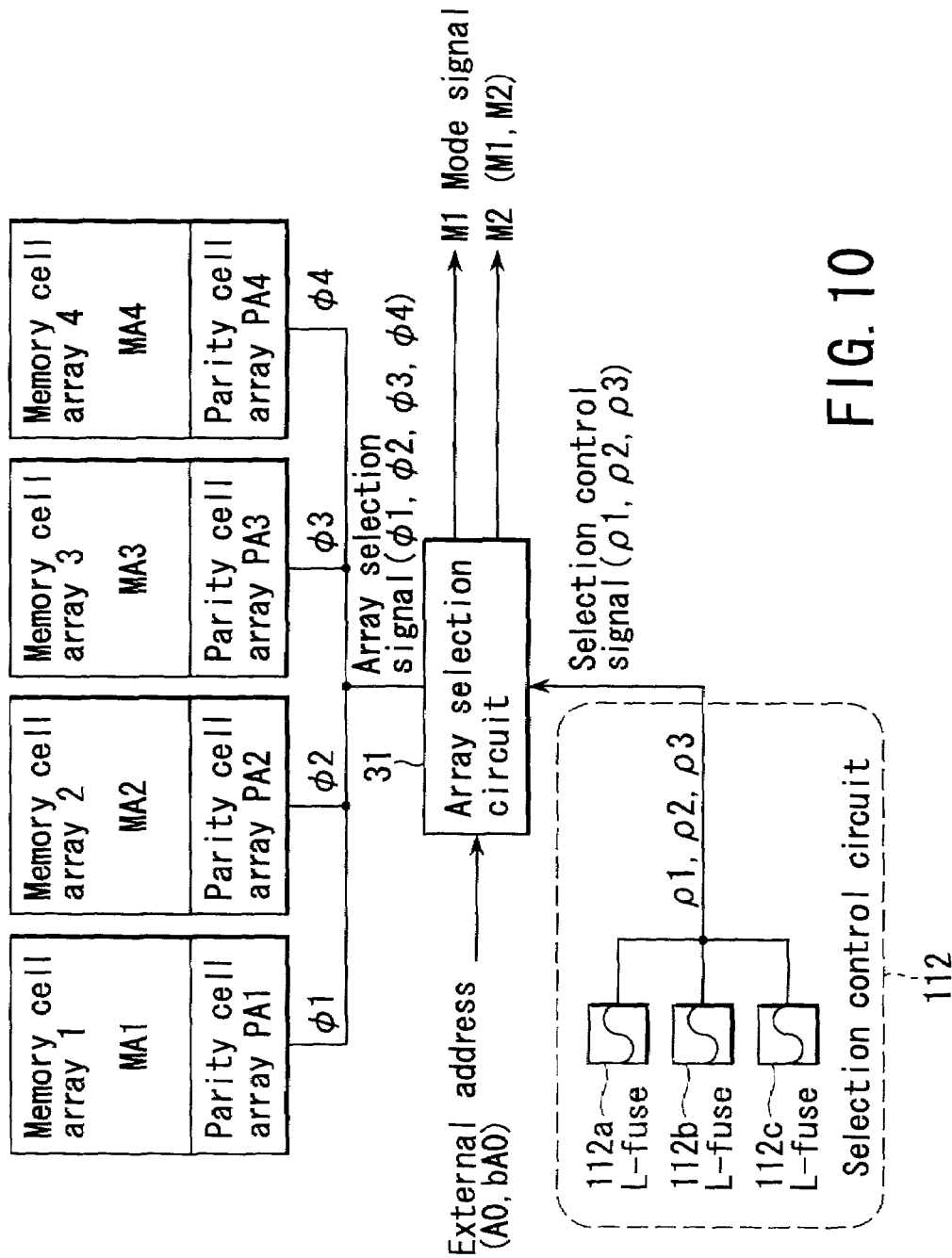
FIG. 10 is a schematic block diagram of a semiconductor device, which is referred to as the second embodiment of the invention.

FIG. 10 is a schematic block diagram of the second embodiment of semiconductor device according to the invention and corresponds to FIG. 4 illustrating the first embodiment. As shown in FIG. 10, the selection control circuit 32 comprising pads 32a through 32c of the first embodiment is replaced by a selection control circuit 112 comprising laser fuses 112a through 112c in this embodiment.

Each of the laser fuses 112a through 112c is adapted to control the signal level of the corresponding one of selection control signals ρ1 through ρ3 by irradiating a laser beam thereto. For instance, selection control signals ρ1 through ρ3 may be held to level "H" and phase-inverted logic signals bρ1 through bρ3 may be held to level "L" before the laser fuses are broken by a laser beam. Then, selection control signals ρ1 through ρ3 may be brought to level "L" when the laser fuses are broken by a laser beam. Of course, the signal levels of "H" and "L" may be inverted. Otherwise, the configuration of this embodiment of semiconductor memory device is same as that of the first embodiment shown in FIG. 4.

As described above, selection control signals ρ1 through ρ3 can be generated as in the first embodiment. The effects of the second embodiment are same as those of the first embodiment.

THIRD EMBODIMENT

This embodiment is realized by modifying the first embodiment, which is a semiconductor memory device adapted to be sold by way of a communication network. This embodiment of semiconductor memory device is characterized in that the selection control circuit is realized by using electric fuses. The basic configuration of this embodiment is same as that of the first embodiment.

Figure 11:
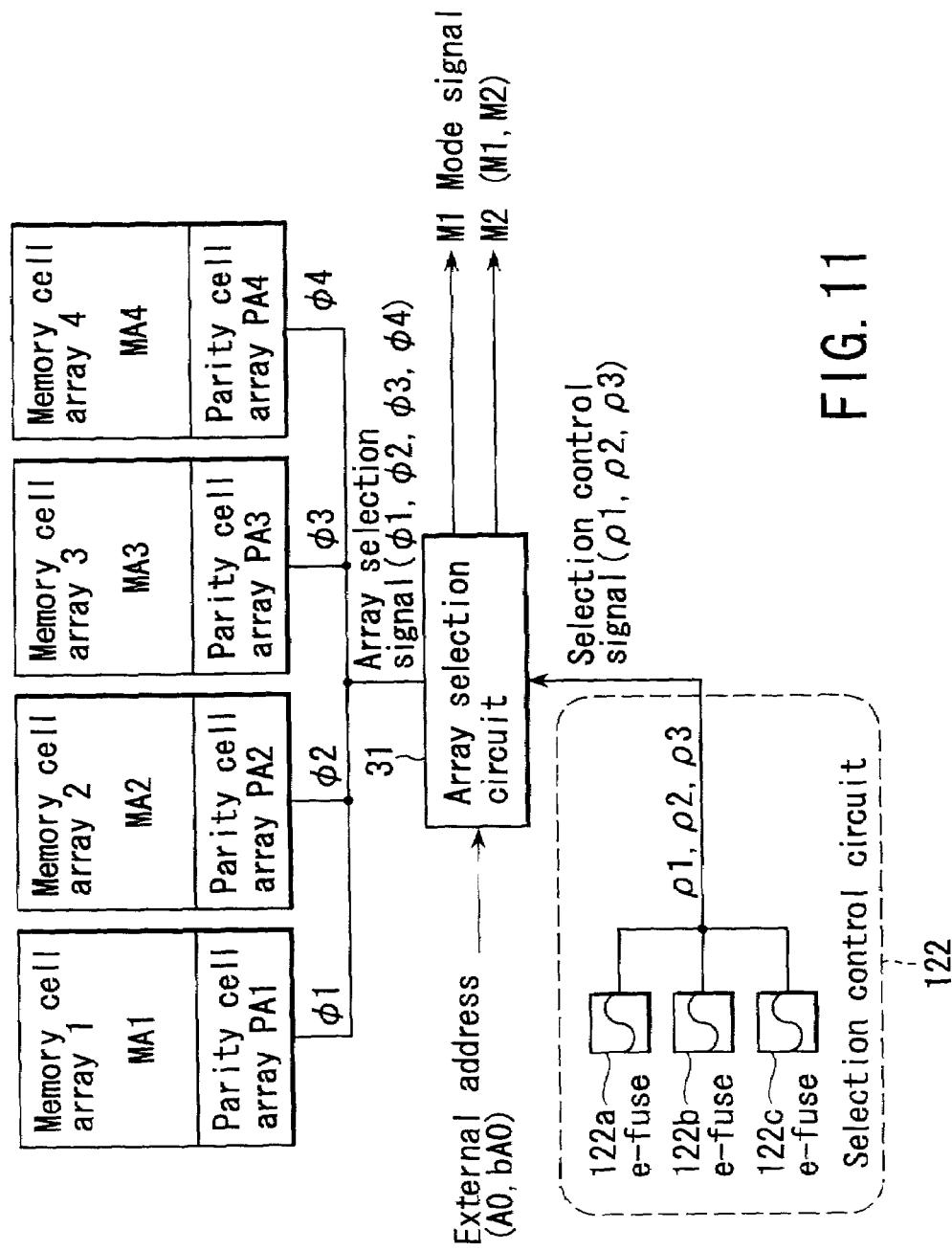
FIG. 11 is a schematic block diagram of a semiconductor device, which is referred to as the third embodiment of the invention.

FIG. 11 is a schematic block diagram of the third embodiment of semiconductor device according to the invention and corresponds to FIG. 4 illustrating the first embodiment. As shown in FIG. 11, the selection control circuit 32 comprising pads 32a through 32c of the first embodiment is replaced by a selection control circuit 122 comprising electric fuses 122a through 122c in this embodiment.

Each of the electric fuses 122a through 122c is a fuse that can be electrically broken so as to control the signal level of the corresponding one of selection control signals ρ1 through ρ3. For instance, selection control signals ρ1 through ρ3 may be held to level "H" and phase-inverted logic signals bρ1 through bρ3 may be held to level "L" before the electric fuses are electrically broken. Of course, inversely, selection control signals ρ1 through ρ3 may be held to level "L" and phase-inverted logic signals bρ1 through bρ3 may be held to level "H". Otherwise, the configuration of this embodiment of semiconductor memory device is same as that of the first embodiment shown in FIG. 4.

With this arrangement, selection control signals ρ1 through ρ3 can be generated as in the first embodiment by using electric fuses in the selection control circuit. The effects of the third embodiment are same as those of the first embodiment.

FOURTH EMBODIMENT

This embodiment is realized by modifying the first embodiment, which is a semiconductor memory device adapted to be sold by way of a communication network. This embodiment of semiconductor memory device is characterized in that the selection control circuit is realized by using an internal register circuit. The basic configuration of this embodiment is same as that of the first embodiment.

Figure 12:
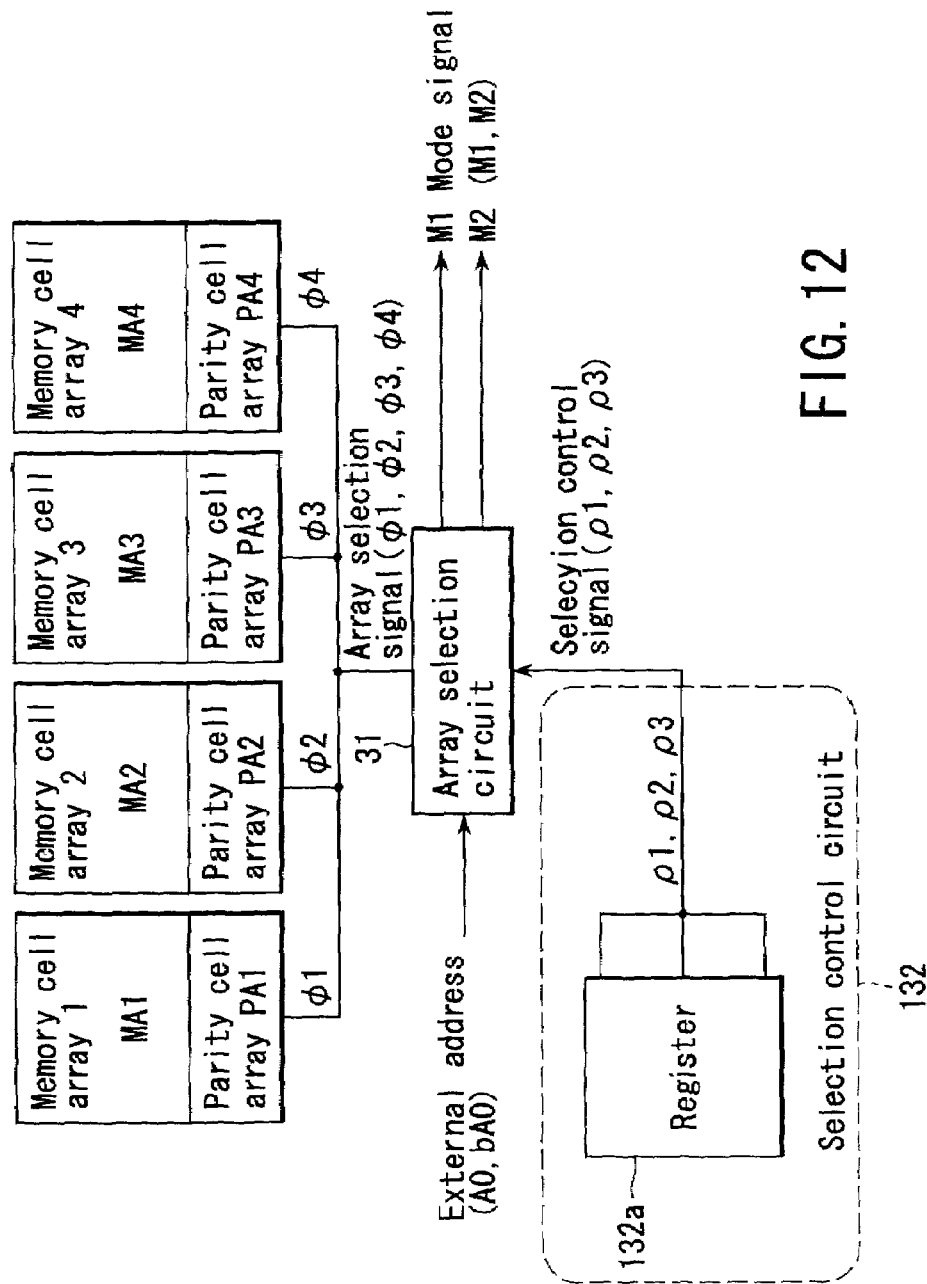
FIG. 12 is a schematic block diagram of a semiconductor device, which is referred to as the fourth embodiment of the invention.

FIG. 12 is a schematic block diagram of the fourth embodiment of semiconductor device according to the invention and corresponds to FIG. 4 illustrating the first embodiment. As shown in FIG. 12, the selection control circuit 32 comprising pads 32a through 32c of the first embodiment is replaced by a selection control circuit 132 comprising an internal register circuit 132a in this embodiment.

The internal register circuit 132a is a 3-bit register circuit. The signal levels of each of selection control signals ρ1 through ρ3 can be controlled by writing binary information to the corresponding bit of the register circuit 132. For instance, when level "H" is written to each of the bits of the register circuit, selection control signals ρ1 through ρ3 may be held to level "H" and phase-inverted logic signals bρ1 through bρ3 may be held to level "L". Of course, it may be so arranged that selection control signals ρ1 through ρ3 are held to level "L" when level "H" is written to each of the bits of the register circuit.

Of course, the signal levels of "H" and "L" may be inverted. Otherwise, the configuration of this embodiment of semiconductor memory device is same as that of the first embodiment shown in FIG. 4.

With this arrangement, selection control signals ρ1 through ρ3 can be generated as in the first embodiment by using a register circuit for the selection control circuit. The effects of the third embodiment are same as those of the first embodiment.

FIFTH EMBODIMENT

This embodiment is realized by modifying the first embodiment, which is a semiconductor memory device adapted to be sold by way of a communication network. This embodiment of semiconductor memory device is characterized in that the selection control circuit is realized by using pads, laser fuses and electric fuses. The basic configuration of this embodiment is same as that of the first embodiment.

Figure 13:
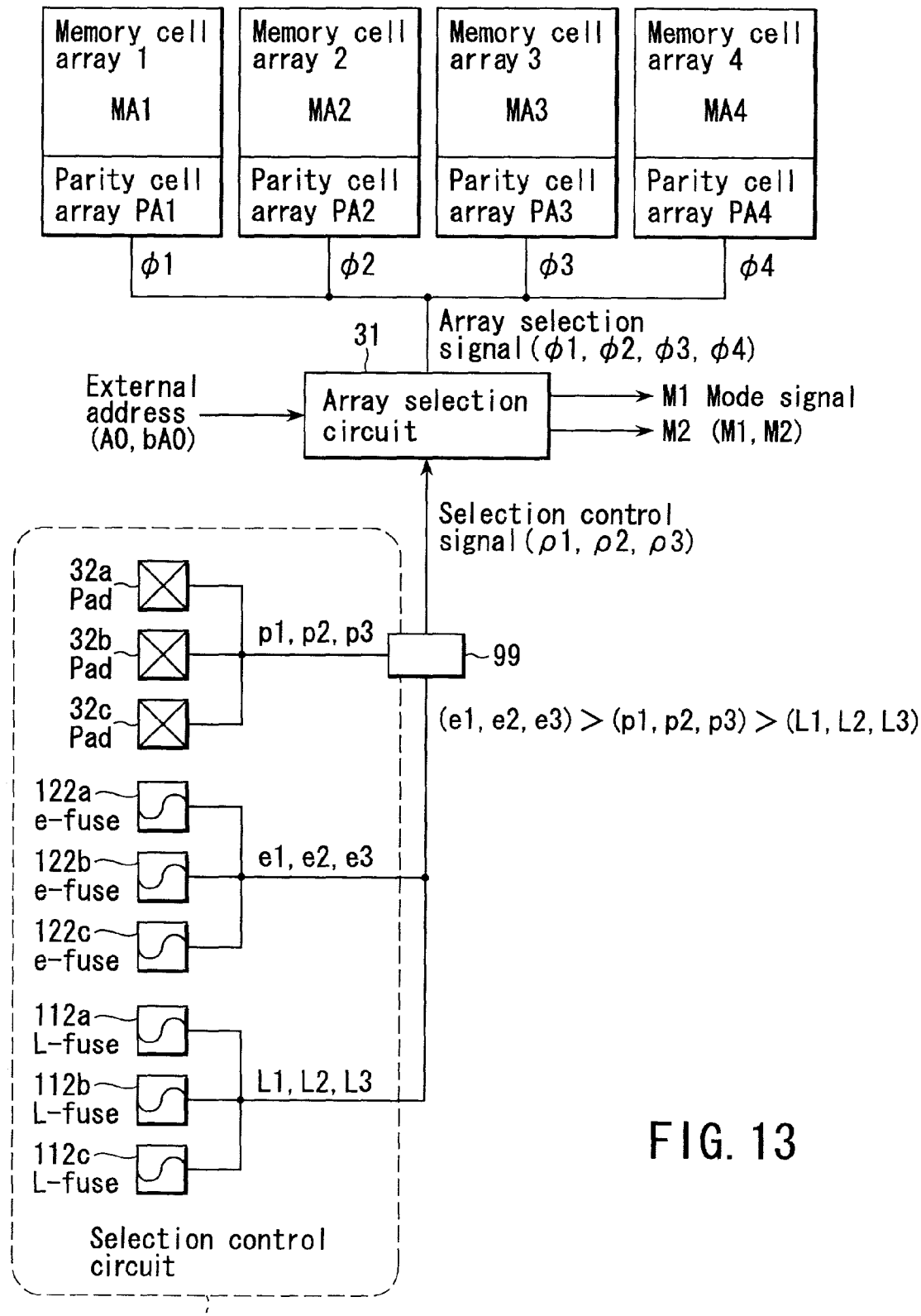
FIG. 13 is a schematic block diagram of a semiconductor device, which is referred to as the fifth embodiment of the invention.

FIG. 13 is a schematic block diagram of the fifth embodiment of semiconductor device according to the invention and corresponds to FIG. 4 illustrating the first embodiment. As shown in FIG. 13, the selection control circuit 32 comprising pads 32a through 32c of the first embodiment is replaced by a selection control circuit 142 comprising three different types of selection control signal output means including three pads 32a through 32c, three laser fuses 112a through 112c and three electric fuses 122a through 122c in this embodiment.

Now, the configuration and the operation of the selection control signal 142 will be described in detail.

The three different types of selection control signal output means are same as those used in the first through third embodiments. Thus, the pads 32a through 32c can respectively output three binary selection control signals ρ1 through ρ3 depending on if the they are bonded to the Vcc terminal or not. The electric fuses 122a through 122c can respectively output three binary selection control signals e1 through e3 depending on if they are electrically broken or not. Similarly, the laser fuses 132a through 132c can respectively output three binary selection control signals L1 through L3 depending on if they are electrically broken or not.

The three types of selection control signal output means are weighted. More specifically, for example, priority is given in the order of the electric fuses 122a through 122c, the pads 32a through 32c and the laser fuses 112a through 112c and hence they are weighted in the above mentioned order.

For example, if selection control signals L1 through L3 are generated to selectively activate the memory cell arrays MA1 through MA4 by appropriately breaking the lowest priority laser fuses 112a through 112c, selection control signals p1 through p3 or e1 through e3 will be output to the array selection circuit 31 as priority selection control signals provided that selection control signals p1 through p3 or e1 through e3 are generated by bonding the higher priority selection control signal output means, or the pads 32a through 32c, or electrically breaking the higher priority selection control signal output means, or the electric fuses 122a through 122c, whichever appropriate.

The operation of selecting L1 through L3, p1 through p3 or e1 through e3 as selection control signals ρ1 through ρ3 and outputting them to the array selection circuit 31 is performed by signal selection circuit 99.

Thus, with this embodiment, selection control signals ρ1 through ρ3 are generated as in the first embodiment by using a selection control circuit comprising three different types of selection control signal output means including pads, laser fuses and electric fuses. Therefore, the net result will be same as that of the first embodiment. Additionally, since this embodiment comprises a plurality of types of selection control signal output means unlike the first embodiment comprising only a single type of selection control signal output means, one of the three types of selection control signal output means can be used if the remaining two types are unusable. Still additionally, as the plurality of types of selection control signal output means are prioritized and weighted, the selection control signals from a higher priority selection control signal output means can be used to overlay the selection control signals from a lower priority selection control signal output means and output to the array selection circuit 31.

While three different types of selection control signal output means are prioritized and weighted for outputting selection control signals to the array selection circuit in this embodiment, the number of types of selection control signal output means is not limited to three. For instance, alternatively, two different types of selection control signal output means including pads and electric fuses may be prioritized and weighted for outputting selection control signals to the array selection circuit. Furthermore, the combination of pads and electric fuses may be replaced by the combination of pads and laser fuses or the combination of laser fuses and electric fuses for the two types of selection control signal output means.

The present invention is by no means limited to the above described embodiments.

The first through fifth embodiments of semiconductor device according to the invention are described in terms of sales network for selling semiconductor devices. All the above semiconductor devices are perfectly good products obtained by modifying partially usable products including their circuit systems. However, such perfectly good products are only part of products that can be sold by way of a sales network according to the invention. In other words, partially good products whose circuit systems have not been modified and that have good and no-good parts and hence partly operate effectively can also be sold by way of a sales network according to the invention. Additionally, semiconductor devices that are perfectly good products and does not have any no-good part can also be sold by way of a sales network according to the invention. Not only semiconductor devices such as the above described embodiments but also logic devices may also be sold by way of a sales network according to the invention.

Still additionally, while the above described sales system was defined as a so-called inverted auction system, the present invention is by no means limited thereto. For instance, it may be so arranged that, each time a no good product is produced, the server registers it as partially good product to be sold by way of the seller terminal 2 and the specifications of the product are shown on a web page of the network for the convenience of the possible buyer. Additionally, it may be so arranged that the server automatically generates price-related information on the partially good product to be sold that is interlocked with the trend of the price zone of the market for similar partially good products. With such an arrangement, then the seller terminal is not prompted to provide price-related information on the partially good product, although the server processor needs to store and update information on the trend of the price zone of the market for similar partially good products or obtain such information by way of the network. When the server is adapted to automatically generate price-related information on the partially good product to be sold that is interlocked with the trend of the price zone of the market for similar partially good products, preferably the lower limit may be provided for the price as the cost for disposing it as waste. The cost for disposing the partially good product as waste is provided from the sell terminal to the server so that the server sets the price of the partially good product at a level higher than the cost of the waste disposal.

Furthermore, the server and the seller terminal are adapted to exchange information in any of the above described embodiments. However, the seller may alternatively operate the server. Then, it is no longer necessary to use the seller terminal.

While the seller publicizes information on the partially good products he or she wants to sell including the specifications thereof on a web page in the above described embodiments, any other appropriate publicity technique that do not involve the use a web page may alternatively be used for the purpose of the invention so long as such a technique allows a plurality of sellers who want to sell similar products to access the information.

Furthermore, while the processor 12 is adapted to store a program to be executed for the purpose of the invention in the above description, the present invention is by no means limited thereto. For example, it may alternatively be so arranged that the server reads the program from a computer readable recording medium storing it by means of a recording medium reading apparatus and has the processor 12 execute the program.

While the pads of a semiconductor device are bonded to a Vcc terminal so as to be brought to level "H" from level "L" in the above description, the present invention is by no means limited thereto. For example, it may alternatively be so arranged that the pads are set to level "H" before being bonded to the Vcc terminal and brought to level "L" as they are bonded to the Vcc terminal.

Finally, while the present invention is described above in term of six combinations of two memory cell arrays selected from four memory cell arrays MA1 through MA4, the present invention is by no means limited thereto. The number of combinations remarkably increases as the number of memory cell arrays rises. In any case, it is only required to provide more than two (not smaller than three) combinations of memory cell arrays that may be selected on the basis of addresses. For selecting m memory cell arrays out of n memory cell arrays MA1 through MA2, m may be any positive integer not greater than n−1. The number of combinations of m memory cell arrays is expressed by the formula of $nCm=\{n\times(n-1)\times\ldots\times(n-m+1)\}/\{m\times(m-1)\times\ldots\times1\}$. However, the present invention is by no means limited to such a number of combinations and any combinations may be used so long as the number of combinations is more than two.

Thus, according to the invention, it is now possible to improve the yield of manufacturing semiconductor memory devices and utilize the limited natural resources in a highly effective way.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
 a plurality of cell arrays;
 a selection control circuit for generating and outputting a selection control signal to be used for generating internal address signals; and
 an array selection circuit for generating said internal address signals on the basis of an external address signal and said selection control signal generated by said selection control circuit and outputting said internal address signals to said plurality of cell arrays to select ones of the cell arrays.

2. The semiconductor device according to claim 1 further comprising:
 at least one pad; and wherein
 said selection control signal being defined by a combination of binary signals, each representing existence or absence of a state of being bonded of a corresponding one of said pads.

3. The semiconductor device according to claim 1 further comprising:
 at least one fuse; and wherein
 said selection control signal being defined by a combination of binary signals, each representing existence or absence of an electrically or physically broken state of a corresponding one of said fuses.

4. The semiconductor device according to claim 1, further comprising:
 at least one register circuit; and wherein
 said selection control signal being defined by a combination of binary signals, each being written in the corresponding one of said register circuits.

5. The semiconductor device according to claim 1 wherein, when all of bits of said selection control signal have the same logic level, said internal address signals are determined only by said external address signal.

6. The semiconductor device according to claim 1 wherein, when bits of said selection control signal have different logic levels, said internal address signals are determined only by said selection control signal.

7. The semiconductor device according to claim 1 wherein said array selection circuit outputs a mode selection signal for identifying a status of the circuit system in terms of having or not having a parity function and a mode selection signal for identify a status of the circuit system in terms of having or not having a function of the cell arrays.

* * * * *

UNITED STATES PATENT AND TRADEMARK OFFICE
CERTIFICATE OF CORRECTION

PATENT NO. : 7,042,790 B2 Page 1 of 1
APPLICATION NO. : 09/964759
DATED : May 9, 2006
INVENTOR(S) : Arikado et al.

It is certified that error appears in the above-identified patent and that said Letters Patent is hereby corrected as shown below:

* Claim 2, column 18, line 13, change "claim 1 further" to --claim 1, further--.

* Claim 3, column 18, line 20, change "claim 1 further" to --claim 1, further--.

* Claim 5, column 18, lines 33-34, change "claim 1 wherein," to --claim 1, wherein,--.

* Claim 6, column 18, lines 37-38, change "claim 1 wherein," to --claim 1, wherein,--.

* Claim 7, column 18, lines 41-42, change "claim 1 wherein" to --claim 1, wherein--.

Claim 7, column 18, line 45, change "identify" to --identifying--.

Signed and Sealed this

Fifteenth Day of August, 2006

JON W. DUDAS
*Director of the United States Patent and Trademark Office*